United States Patent [19]

Delfiol et al.

[11] 3,938,399
[45] Feb. 17, 1976

[54] ACCESSORY ANNULAR ELEMENTS FOR TEXTILE MACHINERY AND RELATIVE MANUFACTURING PROCESS

[75] Inventors: Lucio Delfiol, Milan; Luigi Marizzoli, Siziano (Pavia), both of Italy

[73] Assignee: Industrie Pirelli S.p.A., Milan, Italy

[22] Filed: Sept. 25, 1973

[21] Appl. No.: 400,697

[30] Foreign Application Priority Data
Dec. 29, 1972 Italy .................................. 33880/72

[52] U.S. Cl. ................. 74/232; 74/231 P; 156/173; 57/77.3; 428/425
[51] Int. Cl.² .......................................... D04R 3/02
[58] Field of Search ...... 161/35; 156/137, 140, 141, 156/173, 180; 74/231 P, 232; 117/138.8 N

[56] References Cited
UNITED STATES PATENTS

| | | | |
|---|---|---|---|
| 3,194,273 | 7/1965 | Laubarede | 74/232 |
| 3,544,403 | 12/1970 | Zenere | 156/137 |
| 3,689,354 | 9/1972 | Mamok et al. | 117/138.8 N |
| 3,713,347 | 1/1973 | Atwell et al. | 74/231 P |
| 3,783,068 | 1/1974 | Brown | 156/137 |
| 3,792,621 | 2/1974 | Smith | 156/137 |
| 3,830,685 | 8/1974 | Haley et al. | 156/137 |

Primary Examiner—William E. Schulz
Attorney, Agent, or Firm—Stevens, Davis, Miller & Mosher

[57] ABSTRACT

An annular element adapted to be used as an endless belt for false twist machines or the like has a plurality of layers of non-woven fabric impregnated with a cross-linked elastomer, the non-woven fabric weighing from about 10 to about 50 grams per square meter prior to impregnation.

2 Claims, 1 Drawing Figure

U.S. Patent    Feb 17, 1976    3,938,399
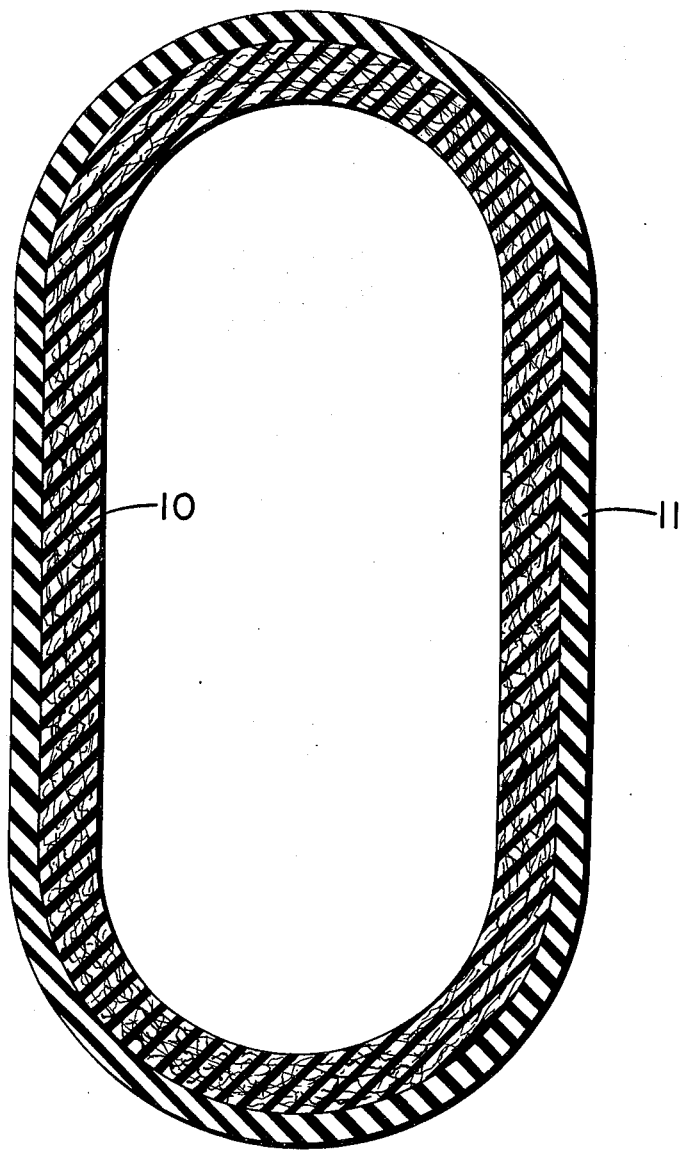

ACCESSORY ANNULAR ELEMENTS FOR TEXTILE MACHINERY AND RELATIVE MANUFACTURING PROCESS

The present invention relates to a laminated product adapted to be used as accessory annular elements for textile machinery, and in particular it relates to belts for false twist machines and to their manufacturing process.

It is known that endless belts for false twist machines are annular elements having a thickness of about 1 mm and a diameter ranging between 50 and 300 mm. The belt is mounted on two cylinders which rotate at a very high speed and presses with a portion of its outer surface against a roller on which the textile yarn is caused to pass under tension immediately before and/or after having been subjected to the false twist process.

A belt of such a kind can consist of any elastomeric material which is resistant to the oils used for treating the textile materials, such as, for example, a nitrile rubber or polyurethane rubber. Such an article has the disadvantage, however, of an excessive elastic elongation as soon as it is put in use. Moreover, it tends to "creep" in use, i.e., it has a continuous and elastic elongation under a continuous load which is detrimental for the good performance of the belt. To avoid this, it is preferred to use a textile reinforced elastomeric material such as a helical winding of textile fibers or of a knitted tubular fabric. In practice, because of the small thickness required for the article, a sheet of calendered thin rubber composition is applied to a metallic core or mandrel of circular section and having an outer diameter corresponding to the diameter of the belt to be produced and a length corresponding to a multiple of the width of the belt itself. The rubber layer is butt-spliced to form the underlayer of the belt. Then, a textile reinforcement is helically wound or is knitted on the sheet and covered with a sheet of rubber composition wound thereabout in a sufficient number of layers to produce the desired thickness of the article. The unit so formed is subsequently vulcanized and subjected to conventional grinding, cutting into individual belts and finishing.

Because of the thinness of the belt, it is important for it to have a bending modulus as constant as possible. To this end, as said above, the calendered sheet forming the underlayer of the belt is butt-spliced or the underlayer is constituted by a tubular element previously extruded and then inserted on the mandrel, or extruded directly on the latter.

Such belts are not entirely satisfactory. If the textile reinforcement is a knitted fabric, the latter is still too deformable as regards the inextensibility characteristics necessary for good performance. Moreover, the knitting operation increases the cost of the article. The belts provided with the helically wound textile reinforcement, on the other hand, have a poor resistance to the lateral shearing stresses to which they are often subjected. For example, because of even the very small relative displacements of the cylinders on which they are mounted, they have a short useful life. Further, such belts are not adapted to the surface of convex cylinders and tend to slide laterally during their use.

The applicant has now found that it is possible to build up annular elements to be used as accessories for textile machinery, in particular elastomeric rings for false twist machines, in which all the above disadvantages are eliminated.

An object of this invention is to provide a laminated product adapted for use as an accessory on a textile machine. Another object of the invention is to provide an improved small endless belt for a false twist machine. A further object of the invention is to provide a process for making rings of elastomeric material adapted to be used as an accessory for textile machinery.

The objects of the invention are accomplished, generally speaking, by providing a laminated ring adapted to be used as an accessory for textile machinery, in particular a belt for false twist machines, characterized in that it comprises a layer of non-woven fabric of at least partially synthetic fibers wound up to form several superimposed layers and then impregnated with a cross-linked elastomeric composition, the layer of non-woven fabric having prior to its penetration by the elastomeric composition a weight ranging between 10 and 50 $g/m^2$.

The winding of several superimposed layers of the non-woven fabric saturated with the cross-linked elastomeric composition is preferably the true inner part of the annular element while the outer part is, as usual, an elastomeric material which is intimately joined to the winding. Alternately, the impregnated non-woven fabric provided by the invention may be used with a conventional underlayer of elastic material.

It has been found that the laminated article provided by the invention has such physical and mechanical characteristics as to permit also the elimination of the underlayer of elastomeric material normally used in articles of this kind, without affecting the good performance of the product.

As said above, the winding is formed by a layer of non-woven fabric which, when the article is finished, is impregnated by a cross-linked elastomeric composition. Before its impregnation by the elastomeric composition, the layer of non-woven fabric has a weight ranging between 10 $g/m^2$ and 50 $g/m^2$. Preferably, the fabric is of the type in which the fibers are joined together by a chemical-physical treatment during the spinning phase, and are normally defined with the expression "spun bonded". In this case, the fibers constituting the fabric are made of synthetic material, such as polyamide or polyester fibers.

The above indicated weight range clearly identifies a very sheer non-woven fabric, which, even if wound up at moderate tensions, becomes very thin; this makes it possible to provide a winding in which the variation of rigidity between the initial winding point and the remaining part of the winding is actually minimum.

On the other hand, once it is impregnated or penetrated by the elastomeric composition, the winding has on one hand good mechanical characteristics, as for instance a very high tensile strength and a quite satisfactory resistance to lateral shearing stresses in view of the requirements needed for the rings and, on the other hand, such a rigidity as to enable the ring to fit also to convex cylinders without sliding laterally both at low and at high speed.

The laminated product of the invention may be prepared by impregnating a layer of non-woven fabric of at least partially synthetic fibers having a weight ranging between 10 and 50 $g/m^2$ with a solution of a cross-linkable elastomeric composition, winding the resulting layer on a mandrel in at least two turns, applying on the unit a layer of cross-linkable elastomeric composition and subjecting the thus obtained assembly to a heat treatment under pressure until the basic elastomeric composition of the impregnating solution and the elastomeric composition forming the outer layer of the assembly are cross-linked. After the cross-linking treatment, the product is ground and cut into individual rings, and these are subjected to the conventional finishing operations.

If it is desired to provide the annular elements with an underlayer of elastomeric material, a layer of cross-linkable elastomeric composition of minimum thickness is applied on the mandrel before winding the impregnated layer of non-woven fabric on it.

Preferably, the impregnating solution used to treat the non-woven fabric is based on a composition of nitrile rubber or polyurethane rubber, in which the elastomeric component is present in an amount ranging between 10% and 60%. Any suitable nitrile rubber may be used. The class name "nitrile rubber" is used herein to mean rubber-like copolymers of unsaturated nitriles with dienes such as a copolymer of acrylonitrile with butadiene. Suitable nitrile rubbers are disclosed in the book "Synthetic Rubber" by G. S. Whitby, C. C. Davis and R. F. Dunbrook, published by John Wiley & Sons, Inc., New York. The name nitrile rubber has been assigned to such rubbers contemplated by the invention by the Nomenclature Committee of the American Chemical Society.

A suitable substantially non-porous polyurethane elastomer may be used for the polyurethane rubber component. Suitable polyurethane elastomers are disclosed in "Solid Polyurethane Elastomers" by P. Wright and A. P. C. Cuning published by MacLaren & Sons, London. Millable gum polyurethanes of the type disclosed on pages 7 and 153 to 178 of this book can be used to advantage. Commercially available materials which are suitable for the purpose are UREPAN 600 sold by Farbenfabric Bayer AG of Germany, ADIPRENE C sold by E. I. duPont de Nemours, ELASTOTHANE 455 or ZR 625 sold by Thiokol Chemical Ind. and GURANE sold by Michelin.

The basic rubber composition of the solution comprises already known ingredients and additives including fillers and curing agents.

The layer of elastomeric composition which is applied on the winding can already be in the form of a tubular element, directly extruded on the winding itself or obtained separately, and inserted on the latter, or, more simply, it can be a calendered sheet of small thickness which, by several subsequent windings of the sheet itself, constitutes the layer of desired thickness.

The final cross-linking treatment, carried out under pressure, provides an extremely uniform article, since the winding of non-woven fabric and the layer of elastomeric composition form a perfectly compact unit. The uniformity is noticed above all in the inner surface of the article with a very good advantage for its satisfactory performance.

Although the present invention is particularly applicable to annular members such as belts for false twist machines, it can be advantageously applied also to high draft belts or to other annular elements of small thickness intended to work at high speed.

Any suitable solvent may be used for preparing the solution of elastomer used to impregnate the non-woven fabric layer. Suitable solvents for the non-cross-linked rubbers include polar solvents and non-polar aromatic solvents. Ketone solvents such as methylethyl ketone and methylisobutylene ketone are preferably used for the polyurethane rubbers while mixed ketone and aromatic solvents are preferred for the nitrile rubber. The above ketones may be used for the nitrile rubber in mixture with toluene, xylene or similar aromatic solvent. It is preferred that the mixed solvent contain from 30% to 50% by weight ketone and 70% to 50% aromatic solvent. A particularly preferred mixture contains 30% ketone and 70% of the aromatic solvent.

Any suitable polyester fiber or polyamide fiber may be used to make the non-woven fabric. Suitable polyamide fibers are nylon 6 and nylon 66.

The embodiment illustrated in the drawing has an inner annular layer of non-woven fabric 10 prepared by impregnating a non-woven fabric of nylon 6 fibers having a density of 10 g/m$^2$ with a solution of a non-cross-linked polyurethane in methylethyl ketone, winding the resulting layer two turns about a mandrel, coating the fabric with non-cross-linked polyurethane rubber 11, and heating the laminate under pressure until the polyurethane of the impregnating solution and of the coating 11 are cross-linked. The resulting laminated product may then be cut to the desired dimensions.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. In an annular element adapted to be used as a part for textile machinery, comprising a layer of cross-linked elastomeric composition based on an elastomer selected between nitrile and polyurethane rubber, constituting the outer surface of said annular element, a helically wound textile reinforcement, and a second layer of cross-linked elastomeric composition based on an elastomer selected between nitrile and polyurethane rubber, constituting the inner surface of said annular element, the improvement consisting essentially in that the helically wound textile reinforcement is constituted by a plurality of wound layers of a non-woven fabric of synthetic fibers selected between polyamide and polyester fibers, impregnated by a cross-linked elastomeric composition based on an elastomer selected between nitrile and polyurethane rubber, said non-woven fabric having prior to its impregnation by said elastomeric composition a weight ranging between 10 and 50 g/m$^2$, said plurality of wound layers of non-woven fabric being also able to constitute the inner surface of said annular element.

2. An endless belt for false twist machines comprising a helically wound textile reinforcement constituted by a plurality of wound layers of a non-woven fabric of synthetic fibers selected between polyamide or polyester fibers, impregnated with a cross-linked elastomeric composition based on an elastomer selected between nitrile and polyurethane rubber, said non-woven fabric weighing from about 10 to about 50 grams per square meter prior to impregnation.

* * * * *